Dec. 17, 1968 E. P. ARTHUR 3,417,026
GLASS STANDARD FOR FLUORESCENCE
Filed March 17, 1964
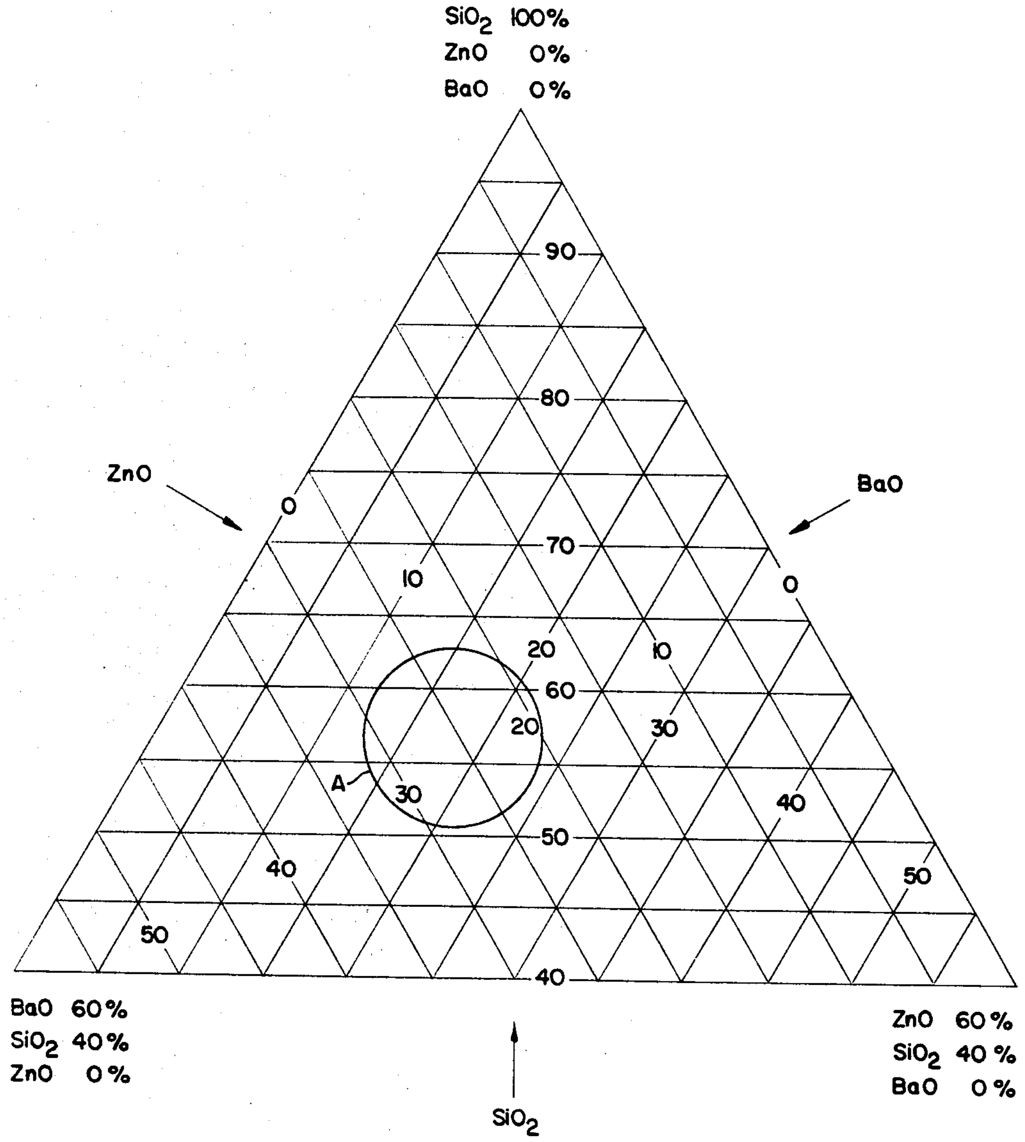
INVENTOR.
EDWIN P. ARTHUR
BY Thomas L. Peterson
ATTORNEY United States Patent Office 3,417,02
Patented Dec. 17, 19( 3,417,026
GLASS STANDARD FOR FLUORESCENCE
Edwin P. Arthur, Fullerton, Calif., assignor to Beckman Instruments, Inc., a corporation of California
Filed Mar. 17, 1964, Ser. No. 352,548
4 Claims. (Cl. 252—301.6)

ABSTRACT OF THE DISCLOSURE

A glass having a natural fluorescence on the order of 10 parts per billion quinine sulfate equivalent or less which may be utilized as a standard for comparisons with unknown liquid samples in an analytical instrument. The glass is preferably a zinc-barium-silicate composition with the barium provided in the prefusion mixture as a plurality of barium compounds well known in the glass-making art.

This invention relates to a glass standard for fluorescence and, more particularly, to a glass which may be used as a standard or reference for evaluating the energy of fluorescence of samples or the like.

Glass or something equally durable, such as a porcelain enamel or ceramic glaze, is desired as a standard for the evaluation of the energy level of fluorescence. A fluorescent glass, for example, may be calibrated equivalent to a certain concentration of a chemical compound of interest. This is accomplished by comparing the emission of the glass under excitation with that of a known concentration of an aqueous chemical held in a special test tube. Then by substituting unknown liquid samples, comparisons may be continued with the fluorescent glass. Such a method has the advantage that, after an initial calibration, it is then not necessary to repeatedly formulate known chemicals. A typical instrument for performing this method is a non-scanning, double-beam filter device which directly indicates the fluorescence ratio of a sample to a glass standard, both of which are simultaneously exposed to ultraviolet radiation from a special double-beam lamp. Such an instrument is generally referred to as a fluorometer. For such an instrument there is required a series of fluorescent glass standards with which the fluorescence of aqueous chemical samples may be compared. A set of glass standards required for such an instrument should have a range from nearly zero to two thousand parts per billion of quinine sulfate equivalent, which is the range wherein samples of interest are most commonly encountered in clinical fluorometry or other fields in which the fluorometer generally is used.

A glass having the following characteristics is desired for use as a standard in fluorescence measurements:

(1) Low natural fluorescence on the order of 10 parts per billion or less of quinine sulfate equivalent.
(2) High stability, that is, the glass exhibits a chemically durable surface after fabrication to shape.
(3) Quickly reaches a fluorescent equilibrium, that is, emission from the glass rapidly becomes a constant function of excitation thereof.
(4) Low temperature coefficient of fluorescence.
(5) Does not degenerate in shelf storage.
(6) Does not decay, that is, does not suffer progressive molecular reorientation as a result of continued and repeated exposure to ultraviolet radiation.
(7) Does not quench the fluorescence from sub-surface glass structure.
(8) Can be readily melted, refined and fabricated by conventional equipment.

Heretofore, no glass has been found that has all of th( desired characteristics.

It is, therefore, the principal object of the present : vention to provide a glass standard for fluorescen which has each of the above stated characteristics.

Another object of the invention is to provide a fluor( cent glass which has a predetermined level of fluorescen( is stable and does not decay.

According to one principal aspect of the present i vention, it has been discovered that by forming a gl: having a composition of $SiO_2$, an oxide of a metal su as zinc, tin, indium or antimony and an alkaline ea: metal; and by providing the alkaline earth metal in t prefusion mixture as three or more different alkali earth metal compounds, well known in the glass-maki: art; an extremely low natural fluorescent glass, having t above-mentioned desirable characteristics, is obtained.

According to another aspect of the invention, a gl: having a predetermined level of fluorescence and virt ally no decay may be provided by adding to the prefusi( mixture of the above-described low fluorescence glass known amount of a fluorescent metal such as uraniu:

Other objects, aspects and advantages will become a parent from the following description taken in connecti( with the accompanying drawing in which there is sho a portion of a triaxial phase diagram for a zinc-bariu: silicate glass in which the upper apex represents a gl: comprising 100 mole percent $SiO_2$, 0 mole percent Zr and 0 mole percent BaO, the left apex represents a gl: comprising 60 mole percent BaO, 40 mole percent Si( and 0 mole percent ZnO, and the right apex represents glass comprising 60 mole percent ZnO, 40 mole perce $SiO_2$ and 0 mole percent BaO, the mole percentages bei: calculated from the prefusion mixture of the glass. T: area enclosed by circle A approximately defines t: boundaries of the preferred glass of the invention.

In examining many different glasses for one havi: the desired characteristics for a glass standard for fluor( cence determinations, a zinc-barium-silicate glass c scribed as being an infrared transmitting glass was fou: to have many of the desired characteristics for a gl: standard. However, this glass and glasses of similar co: position have the disadvantage that they have a rel tively high fluorescence on the order of 50 to 100 pa: per billion of quinine sulfate equivalent and decay a result of continued and repeated exposure to ultr violet radiation. I have discovered that in forming o: of the above-mentioned glasses having a composition mole percent calculated from the prefusion mixture 56 percent silica, 16 percent zinc oxide and 28 perce barium oxide, if three or more different compounds, w( known in the glassmaking art of barium are used in t: prefusion mixture, a glass is formed having extreme low natural fluorescence, on the order of 10 parts p billion or less of quinine sulfate equivalent. Such a gl: is also extremely stable, does not decay even over te: or even hundreds of hours of exposure to ultraviol radiation, and has each of the desired properties list( above. A specific example of a zinc-barium-silicate gl: formed with a mixture of various barium compounds a glass formed from a prefusion mixture in parts t weight of 75 purified sand ($SiO_2$), 29 purified zinc oxid and 53 barium nitrate, 41 barium carbonate, and ( barium hydrate, said barium compounds being provid( in approximately equal molar proportions.

Although I do not wish to be bound by any theory, believe that by utilizing more than one compound of t: alkaline earth metal, barium, in the prefusion mixtu: there is a reduction in the partial pressure of each gas ıolten magma forming the glass of the invention ›y minimizing the dissolved gas in the final glass. inimizing the amount of dissolved gas in the final I believe that the sub-micro structure of the glass ıstantially bound in what may be referred to as a 1 lattice." That is, while distorted and not arranged lattice of a crystal, nevertheless the glass is believed substantially free from mobile ions or molecules otherwise would result in a natural fluorescence than the level desired for a glass standard and would cause decay in the fluorescence to occur over ; period of exposure to radiation.

:onsidering the reason for the unexpected results ob- by the instant invention, one might be led to con- he effect of infinitesimal impurities in the prefusion tuents of the glass. For example, iron is a universal ninant of glasses and exhibits a profound effect on on absorbance and transmission. Hence, one might that a reduction in fluorescence and decay result- om the use of more than one barium compound from the fact that the additional barium com- s contain less iron than a like amount of the orig- ompound. An analysis was performed on the three 1 salts used in the specific example described above ıe results that there was found .007 weight percent ic iron in the barium carbonate, .016 weight percent ic iron in the barium hydrate and .001 weight per- ıetallic iron in the barium nitrate. The exact chem- mpound of the iron was not determined. From this is, it must be concluded that the use of barium e and barium nitrate together with barium carbon- approximately equal molar proportions does not the iron content of the glass made exclusively with carbonate. In fact, my preferred glass was found tain .013 weight percent metallic iron. Therefore, en that the iron content of the glass is not a signifi- ıctor in the low fluorescence and decay of the glass. interest to note that my preferred glass, when con- ted with .35 weight percent niobium metal dissolved glass, exhibited a fluorescence of 1400 parts per quinine sulfate equivalent. This illustrates the efficient conversion of energy by a certain atomic ration (the niobium metal) when incorporated in ss. Therefore, it appears that the "liquid lattice" of ıss of this invention offers little opportunity for :ion of energy by means other than fluorescence. quently, the glass has low fluorescence and suffers y no decay.

area defined by circle A in the triaxial diagram in wing shows the preferred ranges of ZnO, BaO and mole percent calculated from the prefusion mix- the constituents of a glass which will have the de- haracteristics of low fluorescence and virtually no f the glass is formed in its prefusion mixture with lity of compounds of barium. It is understood that rium compounds referred to above are all well in the glassmaking art. As seen in the triaxial phase 1, the mole percent of the constituents in the glasses within circle A ranges from about 51 to 63 percent bout 12 to 24 percent ZnO and about 19 to 32 per- O. Glasses outside circle A in the triaxial diagram so stable and become more difficult to melt by :ional methods and equipment. However, glasses within the circle have the desired characteristics ıy be formed by utilizing conventional methods heating the prefusion mixture to about 1500 de- entigrade in a platinum-rhodium crucible until a free magma results.

specific glass example described above made from sion mixture including three different compounds ım yields a fluorescence of about only 5 parts ion or less of quinine sulfate equivalent, a level ore unobtainable. The glass has a peak energy out- r 5400 A. when excited by radiation near 3600 A. ss is extremely stable, has a low temperature coefficient of fluorescence and does not suffer from decay as evident from the fact that the glass does not change in fluorescent emission even when it is subjected to continuous excitation of radiation for as long as 300 hours at ambient temperatures near 25 to 50 degrees centigrade. The glass is also extremely homogeneous in that the fluorescent energy emitted by the glass does not vary more than ±2% over the whole surface of a bar formed of the glass.

Not only is the low fluorescent glass of the invention useful as a zero standard in a fluorometer, it is to be understood that a fluorescent metal may be added to the glass to provide a predetermined level of fluorescence so that the glass may be used as a fluorescent glass standard. A preferred fluorescent metal is uranium although yttrium, thorium and members of the lanthanide series may also be used for the same purpose. The fluorescent metal is added to the prefusion mixture of the glass before melting into a magma. Preferably, uranium is added to the prefusion mixture in the form of a dilute aqueous solution of uranyl nitrate. The uranyl nitrate is first mixed with the pure silica and, thereafter, the zinc oxide and barium compounds are added thereto. Fluorescent glass standards have been formed by adding different amounts of uranyl nitrate to the prefusion mixture of zinc, various barium compounds and silica to provide glass bars having a quinine sulfate equivalent level in parts per billion of 6, 18, 60, 180, 600 and 1800. It has been found that for most applications in which fluorescent glass standards are required for comparison with samples commonly encountered in clinical fluorometry, the above listed standards are sufficient.

Although the specific example described above utilizes three different compounds of barium, it is expected that alkaline earth metals other than barium may be utilized in the prefusion mixture. For example, it is expected that one or more of the alkaline earth metals, calcium, magnesium and strontium, may be substituted for the barium with favorable results. Likewise, it is expected that some or all of the zinc in the glass might be replaced with other nearby metals in the periodic table such as tin, indium or antimony having the requisite property of forming a liquid lattice structure with sufficient viscosity to achieve the vitreous state in cooling from a magma.

Although several embodiments of the invention have been disclosed herein for purposes of illustration, it will be understood that other applications of the invention are possible and that the embodiments disclosed may be subjected to various changes, modifications and substitutions without departing from the spirit and scope of the invention as defined by the appended claims.

What is claimed is:

1. A fluorescent glass standard having a composition consisting essentially, in mole proportions calculated from the prefusion mixture, of about:

51 to 63 $SiO_2$;
12 to 24 ZnO;
19 to 32 BaO;
a predetermined amount of fluorescent metal; and
said glass having a fluorescence resulting from other than said fluorescent metal of no more than about 10 parts per billion quinine sulfate equivalent.

2. A fluorescent glass standard having a composition consisting essentially, in mole proportions calculated from the prefusion mixture, of about:

56 $SiO_2$;
16 ZnO;
28 BaO;
a predetermined amount of fluorescent metal; and
said glass having a fluorescence resulting from other than said fluorescent metal of no more tthan about 10 parts per billion quinine sulfate equivalent.

3. A method of making a glass having low fluorescence including the steps of:

mixing in parts by weight about 75 $SiO_2$, 29 ZnO, 53 barium nitrate, 41 barium carbonate and 66 barium hydrate;

melting the mixture to form a molten glass; and allowing the molten glass to cool.

4. A method as set forth in claim 3 including the additional step of adding to the prefusion mixture a predetermined amount of uranyl nitrate.

References Cited

UNITED STATES PATENTS 2,219,895 10/1940 Hanlein.

FOREIGN PATENTS 842,084 7/1960 Great Britain.

OTHER REFERENCES

Pringsheim, Fluorescence and Phosphorescence, 19 pages 505–507.

Cleek et al.: Development of Special Optical Glas National Bureau of Standards Report No. 5847, Apr. 1958.

Kroger: Some Aspects of the Luminescence of Soli Elsevier Pub. Co., New York, 1948, pages 275, 2 283, and 284.

TOBIAS E. LEVOW, *Primary Examiner.*

ROBERT D. EDMONDS, *Assistant Examiner.*

U.S. Cl. X.R.

106—52